United States Patent [19]
Baker

[11] Patent Number: 4,929,140
[45] Date of Patent: May 29, 1990

[54] RACK LOADER

[76] Inventor: John B. Baker, 306A Maple St., Litchfield, Conn. 06759

[21] Appl. No.: 311,829

[22] Filed: Feb. 17, 1989

[51] Int. Cl.⁵ .............................................. B65G 1/10
[52] U.S. Cl. ..................................... 414/267; 414/280; 414/331; 414/911; 53/152; 198/409; 198/429
[58] Field of Search ............... 414/331, 276, 267, 908, 414/911, 280; 198/429, 409; 53/152

[56] References Cited

U.S. PATENT DOCUMENTS

| | | | |
|---|---|---|---|
| 3,160,295 | 12/1964 | Roark | 414/331 |
| 4,555,215 | 11/1985 | Raasch et al. | 414/331 X |
| 4,621,969 | 11/1986 | Berghäll et al. | 414/331 |
| 4,634,333 | 1/1987 | Butterly et al. | 414/331 |

Primary Examiner—Robert J. Spar
Assistant Examiner—Keith L. Dixon
Attorney, Agent, or Firm—Dallett Hoopes

[57] ABSTRACT

The invention is a loader for loading containers such as large, heavy bottles of bottled-water from a conveyor, into a rack. It comprises a transfer table spaced from the conveyor and generally coplanar therewith. The table includes pairs of upstanding support arms having spacing corresponding to the spacing of the shelves of the rack. Guides are disposed intermediate the conveyor and the table and are adapted to guide the containers in diverging paths from the conveyor into the spaces on the table between the upstanding support arms respectively. Cylinders are provided for moving the containers laterally from the conveyor along the guides and into the spaces. The table is pivotally supported at one end and there is a large cylinder to swing it about the pivot to a vertical position wherein the support arms are horizontal and the containers rest on them. The arms are aligned with the shelves of the rack. Further cylinders are provided to drive the containers from the support arms into the rack.

13 Claims, 4 Drawing Sheets

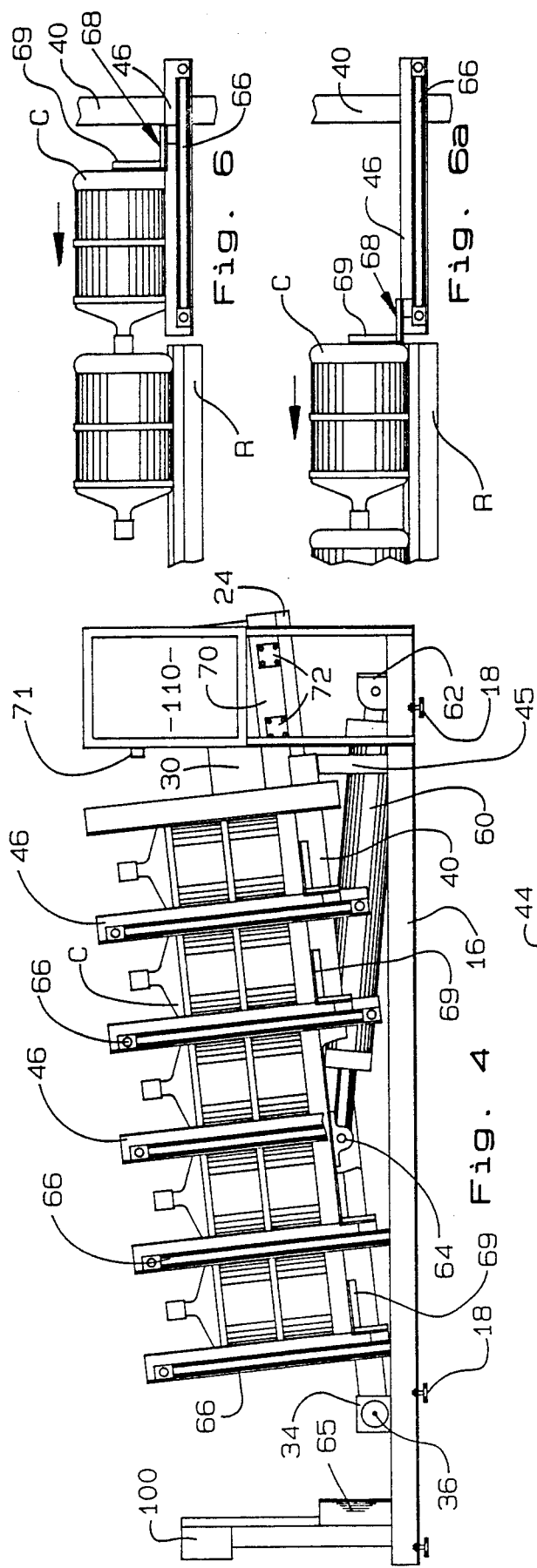

RACK LOADER

BACKGROUND OF THE INVENTION

1. Field of the Invention

This invention relates to rack loaders. More specifically this invention relates to a rack loader in which a preassembly of containers is made and then is installed into the rack. In the process the containers are moved from upright position on the conveyor to positions on their side in the rack. The loader is especially adapted to the loading into a rack of containers such as five-gallon bottles of bottled water.

2. Description of Related Art

While the prior art contains many rack loaders, only a small number relate to the device of the present type. One U.S. Pat. No. 4,634,333 which issued on Jan. 6, 1987 to Butterly, Jr. et al, discloses a rack loader in which containers of milk or the like are transferred from a conveyor first onto the shelves of an elevator and then finally, when the elevator is full, to a waiting rack. By preassembling a group of containers on the elevator, the operator is allowed sufficient time to withdraw a full rack and maneuver an empty rack into position.

U.S. Pat. No. 3,446,369 which issued May 27, 1969 to May et al discloses an automatic bale wagon in which the bales of hay are first preassembled on a support arm and the arm is swung from horizontal to vertical position to load the hay onto the wagon.

In the loading of relatively heavy containers onto a rack the prior art does not suggest the concept of assembling a column of containers in spaced apart relation in a horizontal line, swinging the line to a vertical position and then ejecting each of the containers into the rack.

SUMMARY OF THE INVENTION

The present invention fulfils the above requirement. It comprises means for lining up a row or column of containers in contiguous fashion on a conveyor and for sliding them laterally of the conveyor in a fanning-out pattern to a transfer table, the table having appropriate spaced vertical support arms. The table is pivoted at one end and means are provided to pivot it from generally horizontal position up to vertical position wherein the containers rest on the support arms in alignment with the shelves of the rack. Finally, the loader of the invention comprises means on the arms to drive the containers from the support arms into the openings on the rack. Various safety means and fail-safe arrangements are build into the structure.

A great virtue of the present invention is that because the containers are individually supported when the table is in the vertical position, they can be selectively driven into the rack depending on the vacancies in the rack. For instance, one container can be driven without disturbing the adjacent ones which can be permitted to remain in the table. This is because the containers, when in the table, do not touch each other; they are individually supported and moved.

The unit of the invention is especially designed to load five-gallon bottles of bottled water, which may weigh roughly 45 pounds each, into the openings of a rack. Once these individual racks are loaded, they are transferred by fork lift truck onto the bed of a flat bed truck where the racks are arranged back-to-back across the truck bed so that the bottles oriented with their necks pointed outward of the rack may be manually withdrawn by the delivery man from the racks from either side of the truck.

BRIEF DESCRIPTION OF DRAWINGS

Further objects and features of the invention will be clear from the following specification and drawings, all of which disclose a non-limiting form of the invention. In the drawings:

FIG. 4 is a reduced side elevational view of the loader as in FIG. 3;

FIG. 5 is a slightly reduced sectional view taken on the line 5—5 of FIG. 3;

FIGS. 6 and 6A show sequentially the ejection of a container from its position on the transfer table into the front rank of the rack, shoving the container which previously occupied the front rank into the rear rank; and FIG. 7 is a fragmentary view taken on the line 7—7 of FIG. 2.

DESCRIPTION OF THE PREFERRED EMBODIMENT

Figure 1:
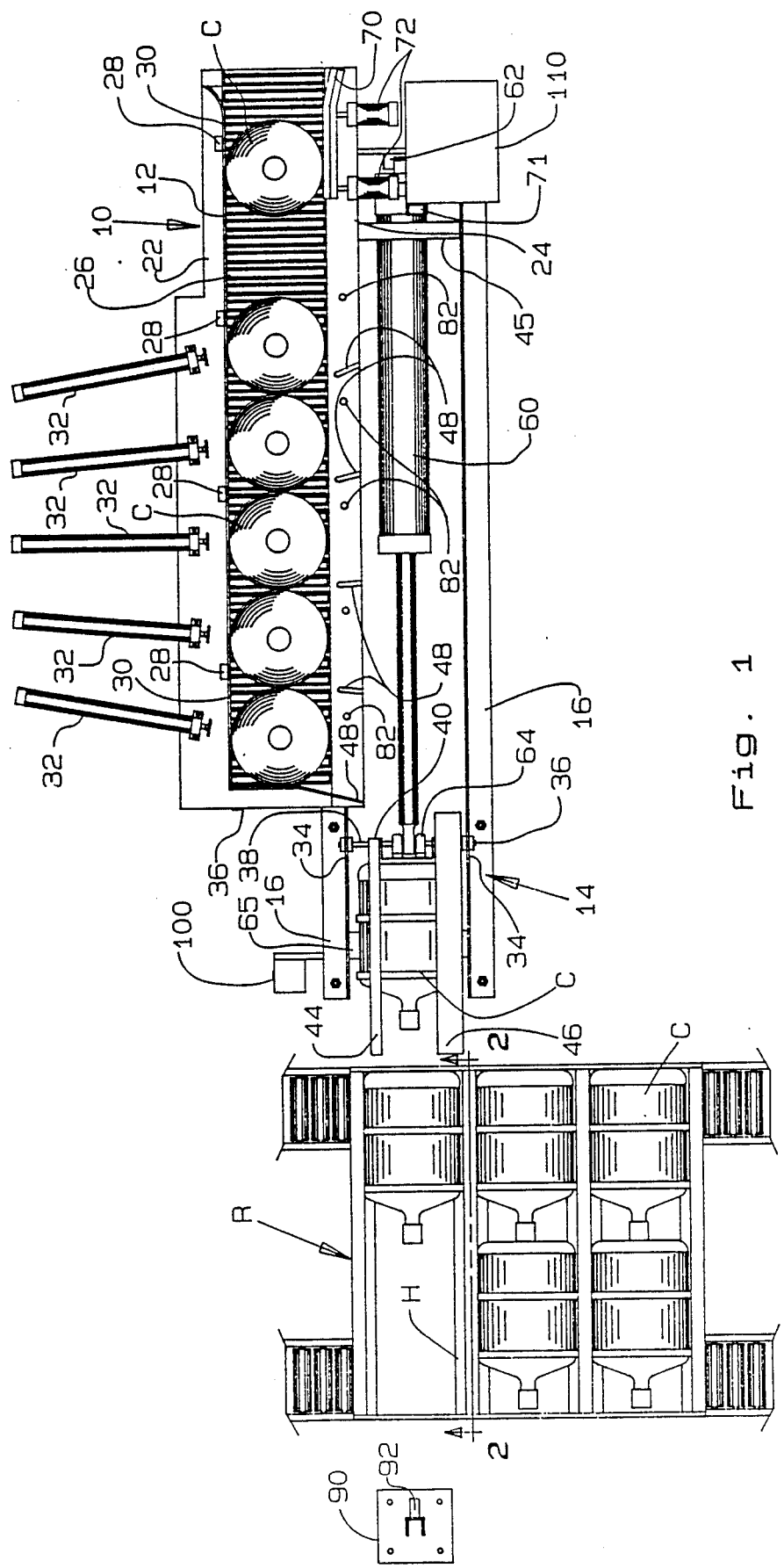
FIG. 1 is a top plan view of an apparatus embodying the invention with the transfer table shown in its vertical position. Also shown is a partially loaded rack.

A rack loader embodying the invention is generally designated 10 in FIG. 1. It comprises an inclined receiving roller-type conveyor 12 and a transfer table 14. Its purpose is to load the rack R with containers.

The loader substructure is shown best in FIGS. 4 and 5 includes three parallel base elements 16 provided with adjustable feet 18 by which they may be supported on an uneven floor. Extending upward in the base 16 are vertical members 20 (FIG. 5) which support inclined side plates 22 and 24. Cross elements 17 are also provided (FIG. 5).

The loader structure is generally of welded stainless steel construction. Comprising part of the receiving conveyor 12, the side plates 22 and 24 journal a line of spaced conveyor rollers 26. As shown best in FIG. 4 the top of the rollers 26 are in the same inclined plane with the side plates 24 and 22.

Plates 22 and 24 (FIG. 3) support a plurality of spaced clips 28 to which are attached a vertical curb 30. Also mounted on the side plate 22 are a plurality of pneumatic cylinders 32 which have their piston stems aimed to move the containers C in the appropriate lateral direction. The piston stems carry on their ends friction shoes 32a as shown.

Extending upward from the parallel side members 16 (FIG. 3) are a pair of brackets 34 in which are mounted aligned bearings 36. Journaled in these bearings is a transverse spindle 38. The leftward end (FIG. 3) of the transfer table 14 is mounted centrally on the spindle 38.

The transfer table comprises a channel-shaped bed 40 (FIG. 5) with the side flanges of the channel directed down to give the table rigidity. Secured to and extending upward at right angles from the bed 40 are a plurality of pairs of spaced vertical arms 44 and 46. The rightward edges each pairs of arms 44 and 46, are aligned and the pairs are spaced apart the distance between the horizontal rails H of the rack R (FIG. 2) so that subsequently when the table is erected to its vertical position (FIG. 2) the arms 44, 46 will align with rails H and containers C will be appropriately spaced to be ejected from the spaces between the pairs of arms 44, 46 into the openings in the waiting rack R. Under the far end of the table 14 from pivot 36 is a horizontal support 45 secured to appropriate risers, and it acts as a support for the table when it is in its horizontal position.

Disposed on the side plate 24 are a number of angled upright guides 48. These guides 48 are angled to direct the containers C respectively from a contiguous relation which they normally assume as they move by gravity down the receiving conveyor 12, to the spaced relationship of the transfer table 14. As a result, when cylinders 32 are activated, the containers C are driven by the pistons of the respective cylinders from the receiving conveyor into the spaced positions on the transfer table 14. It is the guides 48 which ensure this by being angled in the proper direction.

A large cylinder 60 (FIG. 2) has one end mounted in the fixed pillow block 62 and the distal end of its piston shaft pivotally mounted in the pillow block 64 on the bottom of the transfer table 14. As a result of this arrangement, the activation of the cylinder 60 causes the transfer table to swing up about spindle 38 to the vertical position of FIGS. 1 and 2. The leftward arm 46 of FIG. 3 comes to rest on the stop 65 (FIG. 2) supporting the table in vertical position. As the table moves to the vertical position the containers C (FIG. 2) naturally fall to rest on the upper edges of the now horizontal arms 44, 46.

Mounted on the outside of each of the angle-shaped arms 46 (FIG. 2) is a band piston 66. Such pistons are available from the Tol-o-matic Corp. of Minneapolis, Minn. and are designated, for instance Model BC-100-125.

Figure 2:
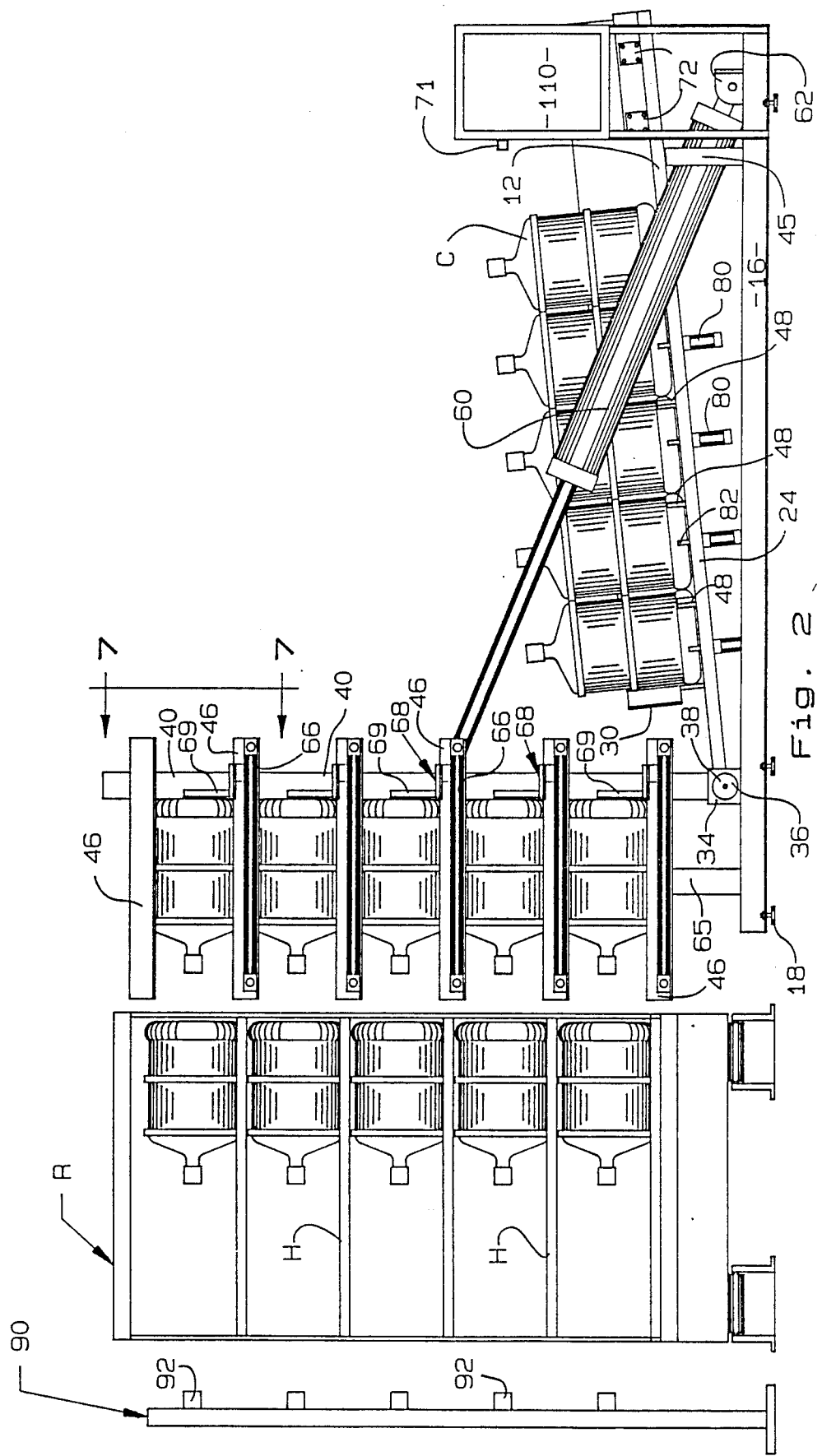
FIG. 2 is a side elevational view of the loader as in FIG. 1. The representation of the rack in FIG. 2 is a sectional view taken on the line 2—2 of FIG. 1.

These pistons each comprise a cylinder having a side wall formed with a longitudinal seal therealong. From the piston within each cylinder a drive pin extends out through the seal. A bracket 68 is disposed on the outside of each cylinder and is connected to the drive pin. The bracket (FIG. 2) includes an upright leg 69 adapted to engage the wide end of the adjacent container C. Thus when the piston is activated the leg 69 moves leftward (FIG. 2).

Opposite the curb 30 at the upper end of the inclined receiving conveyor is a shoe 70 which is designed to hold the upper container C after five other such containers have passed between the shoe 70 and the curb and await the loading process. A counter 71 is mounted downstream of the shoe 70 and at the level of the neck of the containers C for this purpose. The shoe 70 is driven to operative position by a pair of cylinders 72 supported on the horizontal element 24. After the containers C on the receiving conveyor 12 are transferred by cylinders 32 over to the transfer table 14, the stems of the cylinders 32 are retracted and the cylinders 72 are also retracted to withdraw the shoe 70 permitting passage of five additional containers C to the lower portion of the receiving conveyor 12 as shown.

Figure 3:
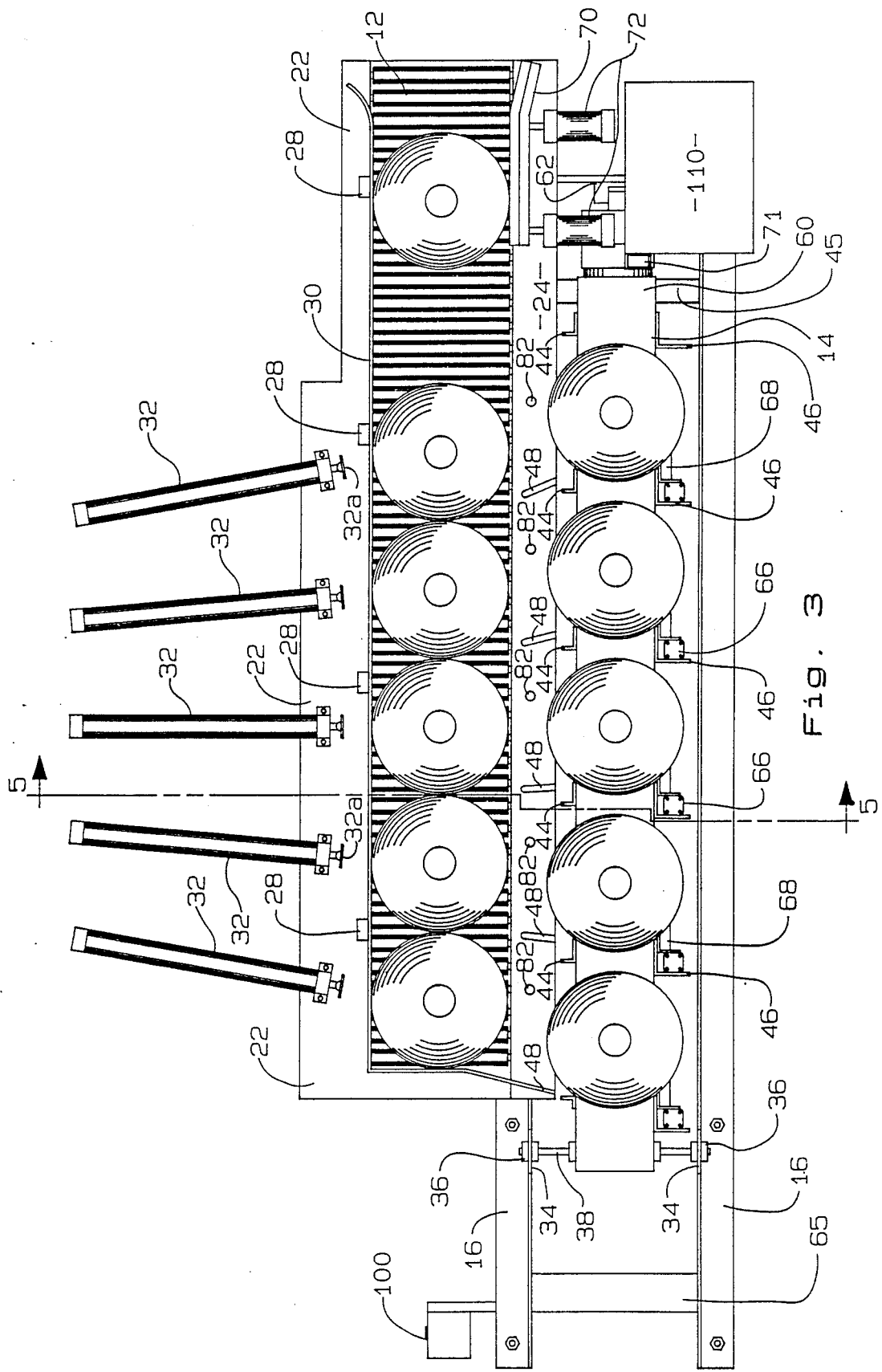
FIG. 3 is an enlarged top plan view of the loader without the rack and showing the transfer table in its more horizontal position.

Mounted on the underside of sideplate 24 are a plurality of upwardly directed cylinders 80 (FIG. 2) which have their piston stems extending through appropriate openings respectively in side plate 24. The stems emerge in the form of pins 82 (FIG. 3). These pins, driven by their associated cylinders 80 extend upward into the path of the containers C until the cylinders 80 are deactivated. The purpose of the pins 82 is to assure that no containers C move by accident toward the transfer table 14 until the appropriate time. The pins 82 are arranged in non-interfering relation with the stems of pistons 32 so that if the pistons are retracted at a time at which the pins are up the heads 32a of the stems will not hit them.

Also part of the rack loader of the invention is the sensing station 90 (FIGS. 1 and 2) which comprises an upright mounting photo-sensitive elements 92 which are designed to sense the presence of container C in the rear rank of the rack. The rear rank is the leftward half of the rack R which is the last rank to be filled in the loading process.

An operator's control box 110 is supported on an upright secured at its lower end to the left end of base element 16 (FIGS. 1, 3, and 4). This box is provided with two manually operated control buttons. One control button is for activating the large cylinder 60 for moving the transfer table 14 from horizontal to vertical position. The other is for activating the band pistons 66 to drive the containers C into the openings of the front rank on the rack R.

For simplicity of illustration the various electrical wiring and pneumatic hoses, etc. are not shown in the drawing. Switches and other electrical gear necessary for the operation of the apparatus are generally mounted in the master control box 110. Adjacent the control box may be a plurality of solenoid valves (not shown) connected to a source of air under pressure and having hoses leading to the various cylinders described above including the band pistons 66. The master control box 110 may include a programable controller which may be purchased from General Electric under the name "Series 1" or the Allen Bradley Company. From this controller wires, not shown, lead to the various elements of the apparatus.

A special advantage of the loader of the invention is its flexibility of operation. More specifically, the loader of the invention can load all of the shelves of a rack at one time as shown or can automatically adapt to load containers into only the vacant shelves if certain shelves are already occupied and others are not. For instance, if the middle shelf, shelf 3, alone is empty, the photo sensor 90 will sense that the rear ranks except for shelf 3 are full and therefore only the band piston for the container opposite shelf 3 is activated during the final loading step.

Such individual movement of the containers is possible because of the "compartmentalized" treatment of the containers on the transfer table whereby the containers do not touch each other and there is no relative friction between adjacent containers and one ca be moved without disturbing the others.

Further flexibility may be imagined when, for instance, one uses racks only three shelves high or if for some reason it is desired to leave empty the top two shelves of a five-shelf rack. This situation may be accommodated by adjusting the top two photosensors 92 to give the controller in box 110 the impression that the top two shelves are already filled so that the top two band pistons will not move containers into those shelves.

SEQUENCE OF OPERATIONS

The operation of the apparatus can best be understood from a description seriatim of the functioning of the programme controller mentioned above. In view of the following explanation, a wiring diagram or ladder logic listing is not necessary to enable one skilled in the art to practice the invention.

At the commencement of a cycle of operation a column of containers is positioned above the shoe 70 with no bottles in the space below the shoe. The transfer table is in its generally horizontal position; that is, inclined on a level with the inclined conveyor.

The first step in operation of the controller is to activate the shoe 70 or brake to permit five bottles to move down the conveyor 12 to ready position as shown in FIG. 1. The counting is accomplished as the bottles are ticked off one-by-one by the counter 71 as they pass by. Upon reaching the five count the controller deactivates the shoe 70 to hold the next waiting bottle in the position shown at the right in FIG. 3. In the second step, there is then a delay programmed in the controller to permit the bottles moved by gravity to reach their "ready" position. This delay may amount to a half second or so.

In the next step, step 3, the controller checks to see that the transfer table 14 is in position. This is accomplished by detecting a signal from a reed switch (not shown) on cylinder 60 that indicates that its piston is fully retracted meaning that the transfer table is down in place.

As a fourth step the controller, working through the solenoids and pneumatic lines referred to above, extends the pistons 32, simultaneously retracting the blocking pins 82 so that the containers are shoved from "ready" position on the conveyor along the guides 48 to the respective spaces on the transfer table between the respective pairs of arms 44, 46. The cylinders driving these pistons are actually in reverse series connection so that as one retracts, the other extends and vice versa.

As a fifth step the controller verifies that all pistons 32 have been fully extended to assure that all containers have been driven to their positions on the transfer table. Each of the cylinders 32 have reed switches that signal to the controller when the respective piston is fully extended. Having received signals that all five pistons are extended, the controller is assured that all of the containers are on the transfer table and at that point as the sixth step it will reverse the cylinders, retracting the pistons 32 and extending the blocking pins 82 to protect against erratic behavior of the containers as described above. (If one of the containers is blocked from entering the space, because it is already occupied by another container, the reed switch will not signal the controller. In this case, when the piston 32 retracts, the container will fall to the lower end of the conveyor ready for the next loading of the transfer table. The controller will then permit the shoe 70 to pass only four additional containers to comprise the next batch of containers at the "ready" position.)

At this point the controller waits to receive the manual signal from the controller box 100 whereupon as step 7 it causes pressurizing of the large cylinder 60, extending its piston to drive the transfer table up.

As the eighth step the controller checks a reed switch attached to the cylinder 60 to verify that that piston is extended. It also determines from an indexing switch on the rack conveyor that a rack is appropriately in place ready to receive the containers.

At this point, step 9, the controller 110 waits to receive a signal from the manual button 100 to activate the band cylinders 66. After the button is pressed, the controller receives input from the photo sensors 92 to indicate that there is space for containers on the individual shelves of the rack. This information is stored in the coils of the program controller and is later used to activate the appropriate solenoids to move the proper band pistons to fill the vacancies in the rack, etc. As step 11, receiving the signal from the button, the controller activates the proper solenoids connected with the band cylinders 66 to drive the brackets 68 and containers in front of them leftwardly toward the shelves designated in the tenth step as having space (FIG. 2).

The controller then, as step 12, waits for verification from reed switches on the band cylinders that the respective band cylinder pistons are extended on the way means that the associated containers have been shoved into place in the front rank of the rack. When all band cylinders signal that they have reached their ultimate extension, the controller in step 13 pressurized the reverse side of the band cylinder pistons and retracts them all along with major table cylinder 60 to bring the table 14 down.

To speed up the loading operation, the loader is able to accomplish some steps of the next loading operation simultaneously with those steps already described. For instance, after step 6 wherein the containers have been shifted onto the transfer table, the controller sets out to make ready the next five containers for processing. Specifically, the controller activates piston 72 to permit the next containers to pass down to "ready" position. After the counter 71 has ticked off five containers, the controller closes the shoe 70. This second line of containers is made to wait in the "ready" position until the reed switch on cylinder 60 indicates that the transfer table has been driven up and returned to horizontal position. This assures that the cylinders are not prematurely shoving the second batch of containers onto the transfer table 14 which is already loaded.

Once the controller receives the signal that the transfer table has been driven up and returned, the controller directs the extending of the pistons 32 as in step 4 above and then sequentially proceeds with the remaining step for that second batch of containers.

In the situation where in step 10 above some of the sensors indicated that there were not bottles on certain shelves of the rack, the controller will only advance the cylinders 32 which relate to those empty racks. Individual containers, having little relative friction with their neighbors in horizontal position, can be broken out of the "ready" line. The containers not moved toward the table 14 will drop down to the lower end of the conveyor for the next grouping. This, again, assures that there will be no attempt to drive containers into spaces that are already filled. Subsequently, the controller will recognize that certain pistons 32 were not extended during the last cycle and will see that the count 71 only ticks off the number of bottles needed to complete "ready" line at five.

It should be understood that the table 14 is always fully loaded as it is driven up to vertical position. This assures that the band pistons 66 will have a container to drive into the rack when the controller gets the signal from the sensing station 90 telling which of the shelves is empty. At the time the table 14 is loaded, the apparatus has no way of knowing whether the rack will be aligned with the same vertical line of shelf spaces.

A convenient feature of the controller is provision of retentive coils to retain memory despite a power interruption. Thus, in the event that the past cycle was not a total one,—that is, all of the pistons 32 were not activated—the controller will recall this and again permit passage past the counter of only the required number of bottles to make the waiting set of five complete. Additionally, the controller is provided with some manual overrides to control various functions despite their predetermined condition as programmed.

Thus the structure and operation of the rack loader of the invention is sufficiently disclosed to enable one skilled in the art to practice the invention. It should be understood that variations and modifications of the structure shown are possible. For instance, the conveyor 12 may be of the belt-type and positively driven to move the incoming containers into line. The shoe 70 may be replaced by a gate which would simply be closed after the count had been made to block passage of further containers. Similarly, the invention may be used beneficially with racks of three or other number of shelves; it is not limited to working with five-container-high racks.

It is envisioned that the movement of the racks in front of the apparatus could be fully automated so that indexing of the rack could be automatic. This could do away totally with the manual control station 100.

The invention is, therefore, not limited but is of considerable extent and should be thought of as having a scope as defined by the following claim language or equivalents thereof;

I claim:

1. A loader for loading containers standing contiguously in a line on a generally horizontal conveyor onto a rack having a plurality of spaced superposed horizontal shelves, the loader comprising a transfer table spaced from the conveyor and having a first position generally coplanar with the conveyor, the table having vertical support means thereon having spacing corresponding to the spacing of the shelves of the rack, guide means disposed intermediate the conveyor and the table and adapted to guide the containers in diverging paths from the conveyor into the spaces on the table between the vertical support means respectively, means for moving the containers laterally from the conveyor along the guide means and into the spaces, table pivot means at one end of the table having a horizontal axis generally perpendicular to the conveyor and means for moving the table upward about the pivot means to assume a second position wherein the table is vertical and the vertical support means now horizontal, are aligned with the shelves of the rack.

2. A loader as claimed in claim 1 wherein the loader further includes drive means on the table to drive the containers along the respective support means and into the respective shelves when the table is in the second position.

3. A loader as claimed in claim 2 wherein the loader further includes means to detect the presence already of a container in a given shelf and to disable the drive means associated with the support means for that shelf.

4. A loader for loading containers standing contiguously in a line on a generally horizontal conveyor onto a rack having a plurality of spaced superposed horizontal shelves, the loader comprising a transfer table spaced from the conveyor and having a first position generally coplanar with the conveyor, the table having pairs of vertical support arms thereon having spacing corresponding to the spacing of the shelves of the rack, guide means disposed intermediate the conveyor and the table and adapted to guide the containers in diverging paths from the conveyor into the spaces on the table between the pairs of vertical support arms respectively, means for moving the containers laterally from the conveyor along the guide means and into the spaces, table pivot means pivotally supporting one end of the table, means for moving the table about the support means to cause the table to swing about the pivot means to assume a second position wherein the table is vertical and the pairs of vertical support arms now horizontal, each support one container and are aligned respectively with the shelves of the rack, and drive means on the table to drive the containers along the respective support arms and into the respective shelves when the table is in the second position.

5. A loader as claimed in claim 2 wherein the loader further includes means to detect the presence already of a container in a given shelf and to disable the drive means associated with the support arms for that shelf.

6. A loader as claimed in claim 4 wherein the drive means comprises a plurality of band pistons having push brackets attached.

7. A loader as claimed in claim 6 wherein the conveyor is provided with a plurality of retractable upstanding pins to assure that the containers cannot inadvertantly leave the conveyor and move toward the table until the appropriate time.

8. A loader for moving cylindrical objects from upright position on a generally horizontal conveyor to supine position in a storage rack, comprising a transfer table pivoted about one end and having perpendicular support means thereon, means to move the containers from the conveyor to the table into the spaces between the perpendicular support means, means to move the table from generally horizontal position to vertical position, and means to eject the cylinders off the support means and into the shelves of the rack respectively.

9. A loader as claimed in claim 8, including further guide means for guiding the containers in a fanning-out fashion in their movement from the conveyor to the spaces between the support means respectively.

10. A loader for loading containers from a conveyor into spaced horizontal shelves of a rack, comprising a transfer table normally coplanar with the conveyor and having spaced upstanding support means, the support means having the same spacing as the horizontal shelves of the rack, guide means for directing the containers from a contiguous line into compartments defined by the support means, moving means for moving the containers laterally from the conveyor along the guides into the compartments respectively, pivot and power means for swinging the table to vertical position in which the support means align with the shelves of the rack, and drive means to drive the containers from the support means into the respective shelves.

11. A loader as claimed in claim 10 comprising sensing means for detecting whether a given shelf of the rack is already occupied with a container and means associated with the sensing means blocking the drive means associated with that shelf if the sensing means establishes that it is so occupied.

12. A loader as claimed in claim 11 wherein the drive means includes a number of cylinders mounted respectively on the support means.

13. A loader as claimed in claim 12 wherein the cylinders are in the form of band pistons and the band pistons each mount a bracket for engaging the container respectively.

* * * * *